United States Patent
Glatt et al.

(10) Patent No.: US 8,649,891 B2
(45) Date of Patent: Feb. 11, 2014

(54) AUDIO SIGNAL GENERATOR, METHOD OF GENERATING AN AUDIO SIGNAL, AND COMPUTER PROGRAM FOR GENERATING AN AUDIO SIGNAL

(75) Inventors: Frank Glatt, Karlsruhe (DE); Torsten Blank, Karlsruhe (DE)

(73) Assignee: Nero AG, Karlsbad (DE)

( * ) Notice: Subject to any disclaimer, the term of this patent is extended or adjusted under 35 U.S.C. 154(b) by 1051 days.

(21) Appl. No.: 12/533,015

(22) Filed: Jul. 31, 2009

(65) Prior Publication Data
US 2010/0057232 A1 Mar. 4, 2010

Related U.S. Application Data

(60) Provisional application No. 61/092,535, filed on Aug. 28, 2008.

(30) Foreign Application Priority Data

Aug. 28, 2008 (EP) .................................. 08015228

(51) Int. Cl.
*G06F 17/00* (2006.01)

(52) U.S. Cl.
USPC .......................................................... 700/94

(58) Field of Classification Search
USPC .......................................................... 700/94
See application file for complete search history.

(56) References Cited

U.S. PATENT DOCUMENTS

| | | | |
|---|---|---|---|
| 5,877,445 A | 3/1999 | Hufford et al. | |
| 5,952,598 A | 9/1999 | Goede | |
| 7,038,118 B1 | 5/2006 | Gimarc | |
| 7,491,878 B2 * | 2/2009 | Orr | 84/609 |
| 7,863,511 B2 * | 1/2011 | McNally | 84/610 |
| 2002/0134219 A1 * | 9/2002 | Aoki | 84/609 |
| 2005/0223879 A1 | 10/2005 | Huffman | |
| 2007/0221044 A1 * | 9/2007 | Orr | 84/609 |
| 2008/0190268 A1 * | 8/2008 | McNally | 84/609 |

FOREIGN PATENT DOCUMENTS

| | | |
|---|---|---|
| EP | 1 956 586 A2 | 8/2008 |
| WO | 2007/106371 A2 | 9/2007 |
| WO | 2008/052009 A2 | 5/2008 |

OTHER PUBLICATIONS

Official Communication issued in the corresponding European Patent Application No. 08015228.3, mailed on Feb. 16, 2009.

Official Communication issued in the corresponding European Patent Application No. 08015228.3, mailed on Jul. 15, 2009.

* cited by examiner

*Primary Examiner* — Joseph Saunders, Jr.
(74) *Attorney, Agent, or Firm* — Keating & Bennett, LLP

(57) ABSTRACT

An audio signal generator for generating an audio signal (20) having a selected length (14) comprises a database interface (10) for accessing a database (12) having information on a plurality of different predefined sequences of audio samples, the information for a sequence comprising an order (12c) of audio samples in the sequence and a duration (12b) of the sequence. The audio signal generator additionally comprises a processor (14) for constructing the audio signal (20) by serially connecting a plurality of sequences using the information on the duration (12b) of each sequence in accordance with the construction algorithm to obtain the audio signal (20) having the selected length (15).

13 Claims, 5 Drawing Sheets

```xml
<NeroScalableAudio version="1.0">
<MetaInfo>
  <Name>Blue Horizon</Name>
  <Category>Abstract</Category>
  <BPM>95</BPM>
  <DefaultDuration>270</DefaultDuration>
  <DefaultFadingDuration>4</DefaultFadingDuration>
  </MetaInfo>
<SampleCollection dir="bluehorizon_nsla">
  <Intro>17</Intro>
  <Outro>18</Outro>
  <Sample id="1">sample_01.nsls[Img1]</Sample>
  <Sample id="2">sample_02.nsls</Sample>
  <Sample id="3">sample_03.nsls</Sample>
  <Sample id="4">sample_04.nsls</Sample>
  <Sample id="5">sample_05.nsls</Sample>
  <Sample id="6">sample_06.nsls</Sample>
  <Sample id="7">sample_07.nsls</Sample>
  <Sample id="8">sample_08.nsls</Sample>
  <Sample id="9">sample_09.nsls</Sample>
  <Sample id="10">sample_10.nsls</Sample>
  <Sample id="11">sample_11.nsls</Sample>
  <Sample id="12">sample_12.nsls</Sample>
  <Sample id="13">sample_13.nsls</Sample>
  <Sample id="14">sample_14.nsls</Sample>
  <Sample id="15">sample_15.nsls</Sample>
  <Sample id="16">sample_16.nsls</Ssample>
  <Sample id="17">sample_intro.nsls</Ssample>
  <Sample id="18">sample_outro.nsls</Sample>
  </SampleCollection>
<SequenceCollection>
  <Sequence>1 2 3 4 5 5 5 6 6 7 13 9 9 10 11 11 12 13 14 14 15 3 8 8 9 9 6 6 7 1 1 16 2 3 8 9 9 9 13 18 14 13 13 9 9 10 11 11 12 9 9 8 8 3 10 14 15 1 1 2 3 3 7 1 1 2</Sequence>
  <Sequence>1 2 3 4 5 5 5 6 6 7 13 9 9 10 11 11 12 13 14 14 15 3 8 8 9 9 6 6 7 1 1 16 2 3 8 9 9 9 13</Sequence>
  <Sequence>1 2 3 4 5 5 5 6 6 7 13 9 9 10 11 11 11 11 3 1</Sequence>
  <Sequence>2 3 4 5 5 5 6 6 7</Sequence>
  <Sequence>4 4 5 7</Sequence>
  <Sequence>2 3</Sequence>
  </SequenceCollection>
  </NeroScalableAudio>
```

FIGURE 4

AUDIO SIGNAL GENERATOR, METHOD OF GENERATING AN AUDIO SIGNAL, AND COMPUTER PROGRAM FOR GENERATING AN AUDIO SIGNAL

The present invention is directed to multimedia editing applications and, particularly, to the generation of an audio signal having a selected length.

Due to the wide distribution of computer-editable audio files and video files, video editing applications such as Nero Vision are becoming more popular. Modern video editing applications not only allow to produce a video using different elementary video streams, but also allow to produce a sound track for the video. To this end, a user may simply concatenate audio files residing on the user computer one after the other. The result of this simple audio editing application, however, is that the sound track only sounds good, when a specific sound file is rendered. However, when there is a transition between two sound files, the sound track does not sound good anymore.

Furthermore, the user has the problem that, normally, the available set of audio samples such as MP3 encoded samples or MP4 encoded samples or audio samples encoded in any other format such as WMA or even un-coded audio samples such as straightforward sequences of PCM values as found on a compact disc (CD) does not include audio samples of specific lengths so that a combined length of several selected audio samples exactly matches with the length of the newly generated video. Therefore, it can be come a tedious task for the user to search through her or his database in order to find a matching collection of audio tracks. Furthermore, it is a tedious task to cut an audio sample at a certain position in order to obtain a new audio signal having a length which is identical to the desired length of the video. When an audio sample in the sequence is cut, such as the last audio sample, this might sound strange from a musical point of view. There also exist iterative procedures, in which one can also change the video sequence so that the length of the video sequence matches with a given audio track length. Due to the fact that a video sequence has its own provisions for aesthetic reasons, it is normally not the case that a video sequence cut to the length of the audio track is fine from an aesthetic point of view.

Therefore, the straightforward video applications are tedious from the perspective of the user and often result in a low quality audio signal from a musical perspective. Therefore, the general user might be a slightly frustrated when starting to edit audio signals to obtain an audio signal having a selected length.

EP 0852049 A1 discloses an audio block sequence compiler for generating pre-described duration audio sequences. In an embodiment, a user using a keyboard/mouse interface chooses an audio segment from a predefined audio library and pre-describes the duration of an audio sequence. Prior to depositing each musical segment in the library, the musical selection is divided into audio blocks that are identified in a corresponding encoding table with characteristics including duration, suitability for being used as a beginning or ending of an audio sequence and musical compatibility with each audio block. Using this characteristic table and user-prescribed criteria, i.e., duration, the audio block sequence compiler generates a plurality of audio sequences satisfying the user-prescribed criteria which can be reviewed such as played or displayed and/or saved for future use. The audio library contains library entries pertaining to a plurality of source audio segments. Each library entry is comprised of a source audio segment and the encoding table which describes the partitioning of the source audio segment into blocks and the characteristics of each block. An audio source segment can be a CD file and may, for example, have 50 seconds. Such an audio segment is partitioned into 10 blocks, wherein each block is 5 seconds long. For each block, a compatibility information as well as the duration is provided so that an audio block sequence compiler can compile a sequence of blocks, in which a new block is added to a list of earlier blocks, when the new block has compatibility to the last block of the list.

The flexibility of this procedure is limited due to the fact that normally, the only compatibility from one block to the next in an audio segment such as an audio file is that the next block in the audio file immediately follows the earlier block.

Furthermore, due to the fact that each block has a duration information and each block has quite a short duration, the storage requirements for storing compatibility information and length information for each block are considerable, particularly in the case where a certain amount of audio material is provided so that the user has at least some flexibility in composing his own audio track.

Additionally, the procedure for compiling a sequence is computationally demanding and inherently long due to the fact that a block only includes a short music portion and the final audio sequence is compiled on a block-by-block basis.

Additionally, the quality of the compiled sequence can be reduced due to the fact that the audio sequence has to be compiled in a serial manner. Thus, as soon as a new block is selected and added to the list, the earlier blocks in the list are fixed regarding their order and cannot be mixed anymore.

Furthermore, due the small block length, repetition effects may occur, which means that repetitions of 5 or 10 second blocks will not sound normal. As a counter-measure against these repetition effects, one can apply quite strong compatibility information so that a block is compatible with only a small number or a single other block. However, this once again reduces the flexibility of the whole procedure.

It is an object of the present invention to provide an improved concept for audio signal generation.

This object is achieved by an audio signal generator in accordance with claim 1, a method of generating an audio signal in accordance with claim 15 or a computer program in accordance with claim 16.

The present invention is based on the finding that a considerably improved concept for audio signal generation is achieved, when the audio signal generation is based on segments of audio samples or segments of audio blocks. Such a segment is a collection of a selected number of different audio samples or audio tracks, which has been preferably composed by a sound designer. Thus, such a predefined sequence sounds good in itself and can be stored in a very efficient manner such as by only including a sequence of IDs referencing to audio samples in an audio database. Furthermore, due to the fact that the sound sequences are predefined and an audio signal generation is not performed on an audio sample by audio sample basis but on a sequence by sequence basis, the number of different sequences does not have to be excessive, but a limited number such as less than 50 sequences or even less than 20 may be sufficient. These sequences which are only required in a limited number can be predefined so that each sequence matches with each of the other sequences. Thus, the sequences can be arranged in any order and any combination which provides high flexibility for finally constructing the audio signal.

In accordance with a preferred embodiment of the invention, the sound sequences are created by a sound designer, i.e., a person having a high knowledge in composing a good sequence, but probably having a low knowledge in creating a sound having a desired length. The latter task is left to the application, which can find sequences and finally construct the audio file, and which does not have to care for beginnings and endings of sequences and whether these beginnings or endings of different sequences fit together from a musical point of view or not.

Furthermore, the length of a sequence is inherently greater than the length of a single audio sample. Therefore, an audio signal having a predefined length is constructed in much larger steps compared to a block-by-block construction process. Furthermore, the calculation effort is reduced compared to a block-by-block construction process due to the fact that the processor for constructing the audio signal only has to handle large sequence durations rather than small audio block durations. Furthermore, the storage requirements are considerably reduced compared to a block-by-block storage of duration and compatibility information, since compatibility information is not required at all anymore and a duration of each audio sample is also not required anymore, but only a storage of a duration of each sequence of the limited number of sequences is still necessary.

Depending on the implementation, a sequence includes at least two audio samples, and an audio sample can comprise a complete track such as a song, or a part of a track. Generally, an audio sample may includes several encoded block, but at least a time portion of an audio signal being larger than a time duration of one second. Such a time duration of one second will typically comprise 44100 audio sampling values for a sampling frequency of 44.1 kHz as used in audio CDs. Other formats use higher or lower sampling rates.

Other features, elements, steps, characteristics and advantages of the present invention will become more apparent from the following detailed description of preferred embodiments of the present invention with reference to the attached drawings.

In the following, preferred embodiments of the present invention are defined in more detail with reference to attached Figs., in which:

FIG. 4 illustrates a construction of the preferred database in XML notation.

Figure 1:
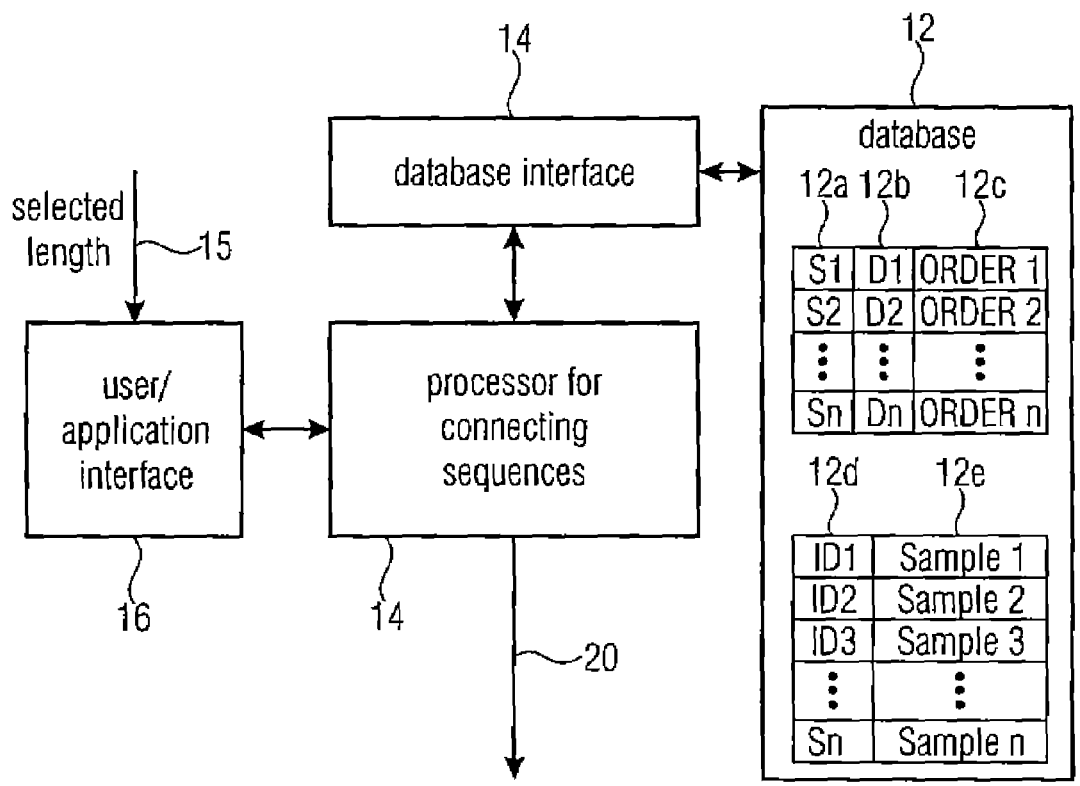
FIG. 1 illustrates a block diagram of an audio signal generator in accordance with an embodiment of the present invention.

FIG. 1 illustrates an audio signal generator for generating an audio signal 20 having a selected length. The audio signal generator of FIG. 1 comprises a database interface 10 for accessing a database 12 having information on a plurality of different pre-defined sequences of audio samples. The information for a sequence comprises an order of audio samples in the sequence as indicated at 12c and a duration of the sequence as indicated at 12b. Preferably, each sequence is referenced by a sequence ID as indicated at 12a in FIG. 1. The sequence-ID can be provided in an explicit form as illustrated in FIG. 1 or can be provided implicitly such as by the fact that different sequences are written in a pre-described order and an ordering index is not required.

In one embodiment, the duration information 12b can be included and fixedly stored in a permanent database. This embodiment, however, is not preferred. Instead, it is preferred that a permanent database together with an XML file as exemplary illustrated in FIG. 4 does not include an explicit sequence duration information. However, an implicit sequence duration information is a reference to audio samples in a sequence given in the order information and a reference to audio samples, which actually have samples, which when played or otherwise analyzed result in a sequence length.

In a preferred embodiment, the initial database does not include an explicit sequence duration information. When initializing the inventive application, a duration for each sequence is explicitly calculated so that, after initialization, a time duration information 12b for each sequence is explicitly existing. This information is then used by an algorithm for selecting sequences and for finally constructing an audio track having a selected length.

Preferably, the sequences $S_1$ to $S_N$ are predefined so that the sequences are serially combinable with each other in preferably any order. In a preferred embodiment, the serial combinability exists from a musical point of view so that the end and the start of each sequence is designed by a sound designer so that the end and the start of each sequence matches with a corresponding end or start of any other sequence. Matching from a musical perspective may include that the beats per minute figure of an end of a sequence is similar to the corresponding figure in the start of another sequence. Furthermore, the mode such as major or minor of the end of a sequence matches with the mode of the start of another sequence. Furthermore, another compatibility criteria may relate to the loudness of the sequence so that a user will not perceive any loudness jump from one sequence to the other.

In order to provide the smooth transition from one sequence to another predefined sequence, a cross-fading operation can be performed in addition which is done in a predefined overlap zone which, of course, has to be accounted for when the complete selected length of the audio signal is to be determined. In a preferred embodiment, however, a cross-fade is not required, since the sequences as designed by the sound engineer perfectly match with each other.

The inventive audio signal generator furthermore comprises a processor 14 for constructing the audio signal 20 by serially connecting a plurality of sequences using the information on the duration 12b of each sequence in accordance with a construction algorithm to obtain the audio signal having the selected length.

The audio signal generator may comprise a user/application interface 16 for receiving a selected length input from a user or from another application. When, for example, a video editing application is considered, in which a user has finalized a video having a certain time length, the video editing application may provide this time length as the selected length to the user/application interface 16 of the inventive audio signal generator either automatically or on request by a user of the video editing application.

Depending on the specific application environment, the processor for connecting sequences indicated at 14 in FIG. 1 may be programmed to output only a single format for the audio signal or may be implemented to provide a selection functionality so that a user can select one of a plurality of different formats. These different formats include the sequence of PCM audio samples, i.e., a sequence of audio sampling values as provided on a compact disc for the whole audio signal. In this output format, the audio signal will not include any sequence or audio sample information anymore, but will only be a sequence of audio sampling values as can be found, for example, on a compact disc.

Another output format is to output the audio signal in a sequence of encoded audio samples. Each audio sample stored in the data base 12 as indicated at 12e is preferably provided in an encoded format such as the MP3 or the MP4 format, where each audio sample is referenced by an audio sample ID as indicated at 12d in FIG. 1. When the processor 14 is operative to output the audio signal as a sequence of encoded audio samples, then the output will not indicate any audio sequence information any more.

Another output format is a sequence of sequence IDs, i.e., the highest level information for each audio sequence. Thus, the audio signal, i.e., the sequence of sequence IDs will only include a collection of sequence IDs 12a, which can then be transformed in any other format using the database 12.

A further selectable output format is a sequence of audio sample IDs, i.e., a sequence of values 12d. In this output format, any sequence information is not required anymore, since the sequence information is replaced by the corresponding order information 12c in the database of FIG. 1, where the order information preferably consists of a sequence of audio sample IDs 12b associated with different audio samples.

In one embodiment, the database 12 can be included in the audio signal generator application. However, other embodiments exist in which the database is an external database and the audio signal generator only includes a database interface 10 and a correspondingly connected processor as indicated in FIG. 1. Further embodiments includes a part of the database internally, i.e., the information 12a, 12b, 12c but the other part of the database, i.e., information 12d, 12e is provided externally and may be any kind of a music library including a freely selectable number of audio tracks, from which a sound designer has created the sequence information 12a, 12b, 12c. Preferably, however, the audio samples can be manipulated with respect to raw audio samples in order to care for matching sequence endings/sequence beginnings.

Although FIG. 1 illustrates a block diagram, it is to be noted that FIG. 1 additionally illustrates a method when the blocks are replaced by corresponding method steps having the functionalities of the blocks. In the same, the method-like flowcharts in FIG. 2 and FIG. 3 additionally illustrate corresponding devices, when the functionality of a method step is replaced by a device actually implementing this functionality.

In a step 21, length information for the audio signal is received. This can be achieved by a user/application interface 16 of FIG. 1 or any other procedure for providing length information. In a step 22, the length, which is to be represented by a collection of sequences, is determined.

Step 22 may include processing of the length information received in step 1. A processing may be the subtraction of an intro length from the length information received as described subsequently. This will be the case, when for example, the construction algorithm performed by the processor 14 is such that each sequence requires a specific intro included in the database 12 (not shown in FIG. 1) or one of a plurality of different intros. Since this first sequence or part of the audio signal is fixed, the actual length to be matched by the processor 14 is equal to the original length minus the length of the intro. Other functionalities of step 22 may include the subtraction or addition of a certain period of time, when the length information 21 is, for example, only the length information of a certain variable part of an audio signal, while the rest of the audio signal is fixed due to specific reasons.

In a step 23, a collection of sequences is selected from the plurality of different sequences provided in the database as indicated at 12a, 12b, 12c of FIG. 1. Generally, this selection is performed so that a total length of the sequences in the collection is smaller than or equal to the length determined in step 22. In the special and rare case, where the length of the collection of sequences is equal to the determined length, the whole process is completed and step 24 is not required. In the regular case, however, the collection of sequences will have a total length which is smaller than the determined length, but the difference of the collection length to the determined length will be smaller than the length of the shortest sequence of the plurality of sequences included in the database 12. Therefore, an addition of another sequence will not be possible due to the fact that the length of the final audio signal would be too high. Therefore, a preferred embodiment of the present invention provides for an additional element in the database, which is fadeable. This element can, for example, be an intro. Then, the fadeable portion would be at the beginning of the signal. Alternatively, this fadeable element might be an outro. Then, fadeability would be at the end of this element. Alternatively, the fadeable element in the database could also be an intermediate audio sample which can be shortened in a flexible manner so that the shortened element matches with the start or the end of sequences in the plurality of sequences stored in the database 12.

Figure 2:
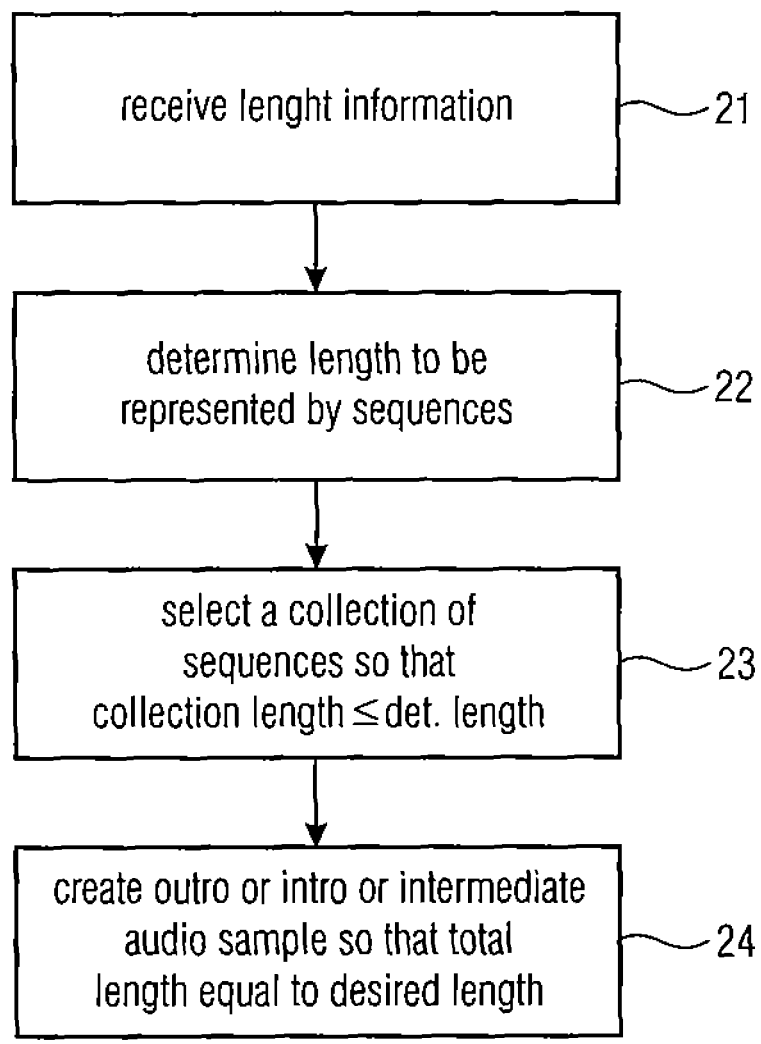
FIG. 2 illustrates a flow chart of a preferred method of the invention.

Alternatively, the outro or the intro or the intermediate audio sample mentioned in block 24 of FIG. 2 can have an overlapping portion so that a cross fade is possible. In any case, however, the outro or the intro or the intermediate audio sample are shortened or lengthened to a degree that the length of the outro or the intro or the intermediate audio sample after the creation in step 24 results, when added to the total length of the collection determined in step 23, in the determined length, which was calculated in step 22.

Figure 3:
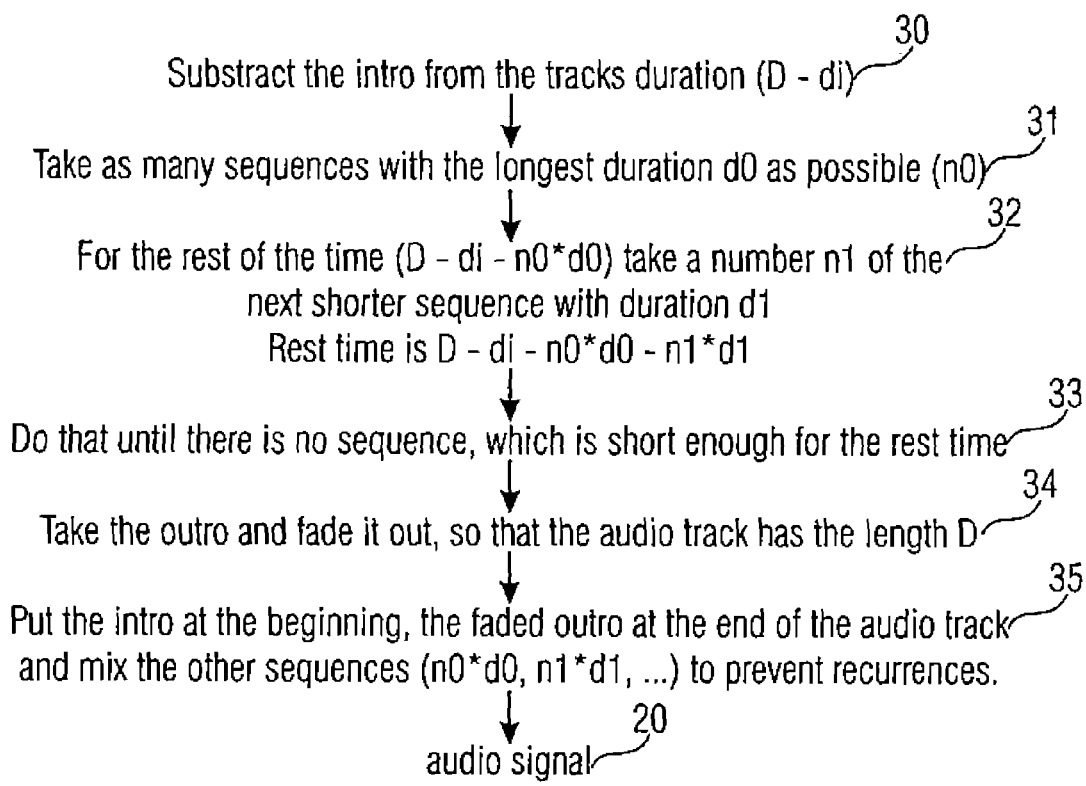
FIG. 3 illustrates a further preferred embodiment of the inventive method.

FIG. 3 illustrates a preferred construction algorithm which can be performed by the processor 14 of FIG. 1. In a step 30, the duration of an intro is subtracted from the selected length (tracks duration). The functionality of step 30 corresponds to the functionality of step 22 of FIG. 2 in a preferred embodiment. The total length, i.e., the length as indicted in step 21 of FIG. 2 corresponds to D, and the length from the intro corresponds to di.

Then, in step 31, the first real selection process is performed. In step 31, the longest sequence in the plurality of sequences, which has a duration smaller than the length determined in step 30 is searched. When, for example, the length as output by step 30 is so that it is longer than 2 times the duration of the longest sequence, two such longest sequences are taken, which means that n0 in step 31 is equal to 2 in this embodiment.

In a step 32, the operations of step 31 are repeated, but with the next shorter sequence with a duration $d_1$, which is smaller than the rest time, i.e., the difference between the length determined by step 30 and 2 times the length of the longest sequence in the above example.

As outlined in step 33, step 32 is repeated until there is no sequence which is short enough for the rest time. In order to fill this remaining gap, i.e., the rest time, step 34 is performed. In step 34, the outro from the database is retrieved and faded out so that the complete audio track (audio signal) has the length D. Thus, the length D will be equal to $n0 \times d0 + n1 \times d1 \ldots nN \times dN + di + do$, where do is the length of the outro after performing step 34.

Generally, $n0, n1, \ldots, ni$ can be any integer greater than or equal to 1.

As indicated in step 35, the intro is put at the beginning of the audio signal, and the faded outro is put at the end of the audio signal. Now, in accordance with a preferred embodiment of the present invention as illustrated in FIG. 3, the other sequences can be freely mixed. Preferably, the sequences are mixed so that recurrences, i.e., two identical sequences being adjacent to each other do not occur as far as possible.

The result of the FIG. 3 embodiment will be a high quality audio signal 20, which consists of individual sequences which have as large as possible individual durations and which are mixed so that recurrences do not occur. Since the sequences are pre-defined and, specifically, pre-defined so that each sequence can be serially connected to any other sequence, the mixing operation of step 35 in FIG. 3 can be performed at the very end of the selection process so that a high quality audio signal with a minimum number of recurrences or no recurrences at all is obtained.

FIG. 4 illustrates a database construction in an XML-like description. The other portion of FIG. 4 includes the information 12d, 12e of FIG. 1, i.e., a sample ID for each audio sample 12e and an additional audio sample which is an intro audio sample. This is sample ID 17 in the FIG. 4 embodiment. Finally, an additional sample which is the fadeable sample-outro is provided which has sample ID 18. Therefore, there exist 16 regular audio samples and an additional intro sample and an additional outro sample. Alternatively, the intro or outro may also be a regular sample of the main part and may be used and referenced as such.

Furthermore, the database includes sequence information including information 12a, 12b, 12c of FIG. 1. In the FIG. 4 embodiment, the order information 12c for the first sequence in FIG. 4 is just a sequence of sample IDs 12d. Thus, a sequence can be very efficiently stored, since a sequence itself is just referenced to the audio sample database 12d, 12e. Furthermore, a compatibility information for each sample is not required as well. A compatibility information is not required for the individual sequences, since in this embodiment apart form the intro and the outro, the sequences are designed from the beginning so that each end of each sequence is compatible with each beginning of each sequence.

In a different embodiment, each sequence includes an explicit sequence duration information, but an audio sample duration is not required. In this case, a calculation of an explicit sequence duration based on implicit duration information is not required at an initialization of the inventive process.

The sequence ID 12a can be implicitly provided by the order of the difference sequences or can be provided explicitly. In an XML file, the order is of no significance.

Furthermore, FIG. 4 illustrates that there exists at least one very long sequence which is longer than preferably ten minutes, and there also exists a quite short sequence which is smaller than one minute. In the embodiment of FIG. 4, the length of the shortest sequence is 41 seconds. This means that, at the maximum, the fadeable outro has to be 41 seconds long. Therefore, the length of the shortest sequence implicitly indicates the length of the fadeable intro, fadeable outro or fadeable intermediate sample as well. Therefore, even the length of the fadeable sample is not necessary. Preferably, the fadeable outro has a length greater than or equal to the length of the shortest sample.

For fading the fadeable sample, the absolute length of the fadeable sample is also not required, since the only necessary information is the length of the fadeable sample after the fading operation which is the difference between the total length of the collection after the construction algorithm, i.e., after step 33 of FIG. 3 and the total length, probably reduced by the length of the fixed intro.

Figure 5:
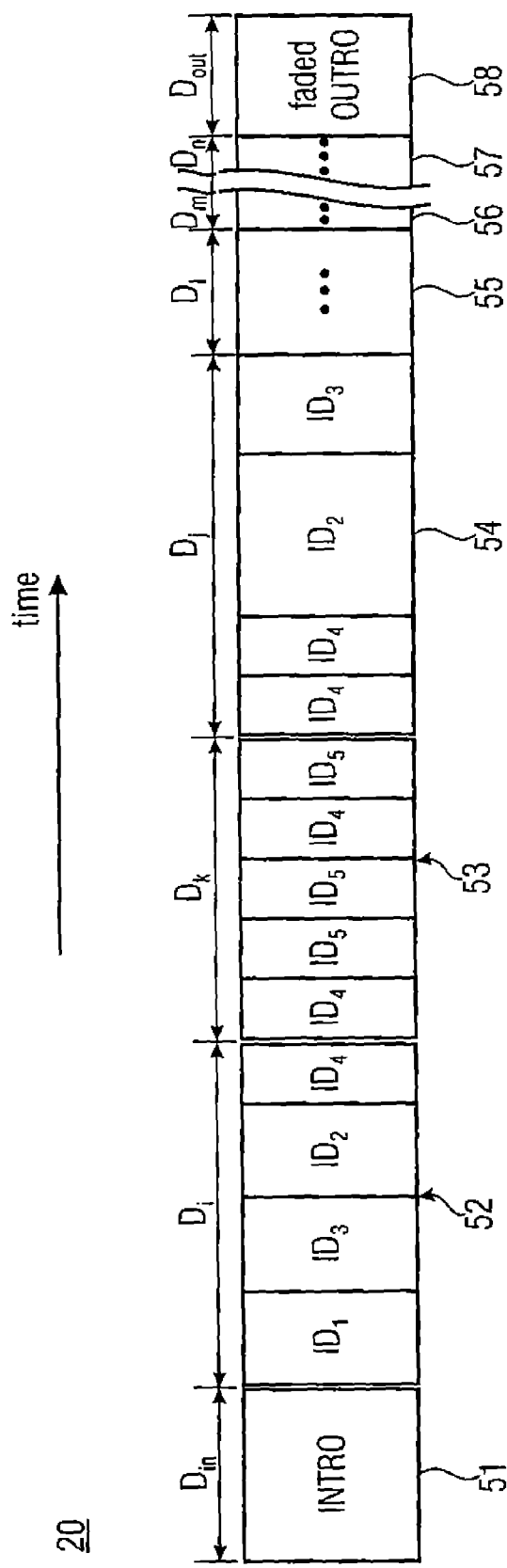
FIG. 5 illustrates an audio signal generated in accordance with the present invention consisting of predefined sequences, where each sequence consists of at least two or even more audio samples referenced by audio sample IDs.

FIG. 5 illustrates an audio signal consisting of an intro 51, a first sequence 52, a second sequence 53, a fourth sequence 54, additional sequences 55 and 56, and 57 and a faded outro 58. On top of FIG. 5, the durations D of the individual sequences is indicated. Furthermore, the individual audio samples 12e are indicated. Specifically, each sequence having a sequence duration D corresponds to a fixed order of audio samples as indicated by the order information 12c. Therefore, the order information for sequence 52 is, for example, the string ID1, ID3, ID2, ID4.

The present invention preferably comprises a special audio format, which can be used as an audio track for user videos in, for example, a video editing application. The audio format can be played like an ordinary sound file (using the given default duration) in an audio player software using the seamless audio algorithm which is implemented as a direct show filter. When using interface calls to this source filter, the audio can be scaled to an arbitrary length and thus allows to set user videos of arbitrary durations to music.

When using a video editing application, the duration of the scalable audio can either be set manually by the user or the video editing application determines the suitable duration. In either case, the audio format and the DirectShow filter assure an optimal result in regards to musical correctness by reassembling single sequences of the music.

In a preferred application for video editing applications, scalable audio files are provided as sound templates in a video editing application. Here, the user can add the scalable audio files to her or his video editing time line and trim the audio object to an arbitrary length/duration. An application would be an automatic cutting function. The cutting function application decides by its own on the duration of the audio. By using the scalable audio format, the video editing application is able to generate a suitable audio title with exactly the same duration as the associated video track without having unexpected truncations of the music or too short music files.

Preferably, the audio signal generator implementation comprises a configuration file in XML-format and a directory of a number between 10 and 20 and preferably between 10 to 15 audio sample files. The audio sample files may be in any format which is preferably a compression format such as Nero Digital Audio or any other format.

The configuration file, which can be played in ShowTime using a DirectShow filter has three parts. A part to hold meta information like name, category, beats per minute, default duration and default fading duration, as indicated in the other part of FIG. 4. A further part is a part to name to collect the different sound samples and to mark two samples as a special intro- and outro-samples and finally a part to specify the sample-sequences of different length which are preferably provided by an external sound designer.

When the scalable audio file will be played without changing the duration, the default duration of the meta info part of the file will be used. When the duration of the audio file be changed using interface calls to the source filter, audio data will be built up by some of the sequences and an intro- and an outro-sample. Additionally, the outro-sample has been composed in a way so that it can be faded out at any time. This is described in the following example.

The NSLA-file defines 6 sample-sequences of lengths: 0 m41 s (SQ1), 1 m01 s (SQ2), 2 m02 s (SQ3), 4 m23 s (SQ4), 9 m26 s (SQ5, 17 m11 s (SQ6) and an intro (IN) of 10 s and a fadeable outro (OUT) of 30 s. Nero Vision wants to put an audio track to a video of duration 15 m12 s. Then the DirectShow-source-filter will provide audio data built up by:

IN+SQ2+SQ4+SQ5+OUT (faded to 12 s)

This chain has exactly the correct length and that its built up by sample-sequences instead of single samples, its assured that the audio output is meaningful in a musical sense.

The inventive format is very convenient as audio track for dubbing of videos, as its length can be arbitrarily chosen.

There is already another patent-registered technique called Smart Sounds, dealing with the same problem. Before a patent will be filed, it has to be tested, that there is no intersection with this other approach.

A preferred embodiment of the present invention will be subsequently described.

The background audio will be an assembly of a big number of small audio-samples provided by an external sound designer. These samples are designed, so that they can be arbitrarily combined. The sample-length are multiples of some (perhaps: 2) beats. The shortest entity is something like 5-10 seconds; the longest can be 8 to 10 times the shortest sample.

These are the samples, which will be needed:
One "Intro-Sample", which will be played once at the beginning.
One "Outro-Sample", which will be played at last and can be faded out at any time
About 10 more samples, which can be concatenated (the number of samples depends on the sound designers needs).
Sample Sequences:
As combining these samples at random does not create harmonic sound tracks, the order of these samples is defined by additional listings ("Sample Sequences") with different lengths: The sequence lengths can be something like: 15 min, 10 min, 5 min, 3 min, 2 min, 1 min, 40 sec, 20 sec, 15 sec. However, the sound designer is free to choose the length according to his needs. With these sequences (and the fadeable "outro-sample"), a sound track of arbitrary length can be constructed.

EXAMPLE

One has the "sample sequences" as described above, an "intro sample" of 10 sec and a fadeable "outro sample" of 15 sec. The audio track has to be 37 m52 s:

37 m52 s=2×15 m+1×5 m+1×2 m+1×20 s+1×15 s+1× 10 s(intro)+1×7 s(faded audio sample).

The sequences have to be rearranged in an "optimum" way with the construction algorithm 37 m52 s=10 s(intro)+5 m+20 s+15 m+2 m+15 s+15 m+1*7 s (faded audio sample).

In a preferred embodiment, "optimum" means that adjacent sequences are different sequences, i.e., it is—as far as possible—assured that two identical sequence are not positioned in immediate time sequence.

Instead of using one single audio file for the main part, the template contains 3 different kinds of samples:
Intro-sample
X different samples and a description of the order (=sequence)
The outro-sample (at the end—An editing application can fade out this sample at any position).

Thus, the video editing application (or rather: the audio filter) has to handle multiple samples instead of one single sample and after applying such a template to the timeline, but the resulting audio track would be perfectly matching to the duration of the video track without unexpected cutting/ending of the audio.

The described embodiment will consist of an XML-style configuration file such as FIG. 4 with the name <name>.nsla and a directory, which includes the samples used to generate the scalable audio. The template file has three selections:
MetaData
SampleCollection
SequenceCollections These are the nodes in the sections:
MetaData:
Name: The GUI-Name for this Audio (Name which will be displayed in the video editing application)
Category: Something like "Abstract", "Kids" or "Wedding"
DefaultDuration: Could be useful if NCSA is played with an audio player instead video editing application
DefaultFadingDuration: Defines the default duration for the fade out of the outro sample at the end. Could be useful if NCSA is used in other application than the video editing application
BPM: Beats per Minute (for later use).
Other meta data such as style mood etc. are possible as well. These data can be used in a search engine environment for implementing a comfortable search or selection possibility in order to establish a group of audio samples or sequences.
Sample Collection
(The attribute "dir" denotes a subdirectory for the samples):
Intro: the ID of the sample, that should be used as the intro.
Outro: the ID of the sample, that should be used as the outro. The outro can be faded out at any time.
Sample: the samples that can be used to create sequences, including the intro and the outro.
SequenceCollection:
Sequence: Meaningful sequences build up as a list of sample-IDs.
Subsequently, a preferred algorithm for creating an audio track of a given duration D is summarized:
subtract the intro from the tracks duration (D−di)
Take as many sequences with the longest duration d0 as possible (n0)
For the rest of the time (D−di−n0*d0) take a number n1 of the next shorter sequence with duration d1
Rest time is D−di−n0*d0*−n1*d1
Do that until there is no sequence, which is short enough for the rest time
Take the outro and fade it out, so that the audio track has the length D
Put the into at the beginning, the faded outro at the end of the audio track and mix the other sequences (n0*d0, n1*d1, . . . ) to prevent recurrences.
If a new duration will be chosen by the user or by the application, the algorithm will be executed again to fulfill the requirements. The durations of the samples will not be donated in the NSLA-file, but they can be determined with the sample-audio files. The durations of the sequences can be calculated out of the samples duration.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An audio signal generator for generating an audio signal having a selected length, comprising:
   a database comprising information on a plurality of different pre-defined sequences of audio samples, a sample being an audio signal comprising a time duration larger than one second, each pre-defined sequence of the plurality of pre-defined sequences comprising at least two audio samples, the information for a pre-defined sequence comprising an order of the audio samples in the pre-defined sequence and a duration of the pre-defined sequence, wherein the audio samples are stored in a library so that each audio sample is identifiable using an audio sample ID, wherein the information for the pre-defined sequence comprises a pre-defined sequence of audio sample IDs as the order of the audio samples; and
   a database interface for accessing the database;
   a processor for constructing the audio signal by serially connecting the pre-defined sequences using the information on the duration of each pre-defined sequence in accordance with a construction algorithm to acquire a collection of pre-defined sequences representing the audio signal a combined duration of the collection of pre-defined sequences being as close as possible to the selected length, a number of pre-defined sequences in the resulting collection of pre-defined sequences being minimum,
   wherein the processor is operative to serially connect the collection of the pre-defined sequences of audio sample IDs for rendering or for generating or storing the audio signal based on a sequential processing of the audio sample IDs and the corresponding audio samples.

2. The audio signal generator in accordance with claim 1, in which the processor is operative to serially connect the plurality of pre-defined sequences so that a difference between the length and the combined duration of the serially connected pre-defined sequences is smaller than a length of a pre-defined outro sample, the pre-defined outro sample being fadeable to reduce the length of the pre-defined outro sample.

3. The audio signal generator in accordance with claim 1, in which the processor is operative
   to select, in an initial step, one or more identical pre-defined sequences, so that a combined duration of the one or more pre-defined sequences is smaller than the selected length or the selected length reduced by a length of an intro sample and so that the selected pre-defined sequence comprises a duration being longer than the duration of all other pre-defined sequences comprising a duration shorter than the selected length or the selected length reduced by an intro sample length;
   when a rest of a time remains which is longer than a duration of a shortest pre-defined sequence of the plurality of pre-defined sequences, to select, in a further step, for the rest of the time, one or more identical pre-defined sequences, the pre-defined sequence selected in the further step being shorter than the pre-defined sequence selected in the initial step, so that a combined duration of the one or more identical pre-defined sequences selected in the further step is smaller than the rest of the time, until there is no pre-defined sequence left for a remaining rest of time.

4. The audio signal generator in accordance with claim 1, wherein the pre-defined sequences comprise different durations, the duration of a longest pre-defined sequence of the plurality of pre-defined sequences being above 5 minutes and the duration of a smallest pre-defined sequence of the plurality of pre-defined sequences is smaller than 1 minute.

5. The audio signal generator in accordance with claim 1, in which the plurality of pre-defined sequences comprises a pre-defined outro sequence, the pre-defined outro sequence being fadeable to reduce the length of the pre-defined outro sequence, and
   in which the processor is operative to serially combine a collection of the plurality of pre-defined sequences to approach the selected length as far as possible and to fade out the fadeable outro sequence so that the duration of the collection plus a length of the faded outro sequence corresponds to the selected length.

6. The audio signal generator in accordance with claim 1, in which the pre-defined sequences are predefined so that the pre-defined sequences are serially combinable with each other under musical rules.

7. The audio signal generator in accordance with claim 1, in which the plurality of pre-defined sequences comprises an intro sequence, and
   in which the processor is operative to serially combine a collection of pre-defined sequences so that a first pre-defined sequence in the collection is the intro sequence.

8. The audio signal generator in accordance with claim 1, in which the processor is operative to serially connect the plurality of pre-defined sequences so that different pre-defined sequences occur twice or more in a collection of pre-defined sequences, wherein the processor is operative to place the pre-defined sequences in the collection of pre-defined sequences so that the final order of the pre-defined sequences is so that an adjacent placement of one and the same pre-defined sequence in the collection of pre-defined sequences is avoided.

9. The audio signal generator in accordance with claim 1, in which the data base interface is operative to access an XML file comprising the information on the pre-defined sequences as a pre-defined sequence of audio sample IDs for each pre-defined sequence and comprising the duration for each pre-defined sequence.

10. The audio signal generator in accordance with claim 1, in which the data base interface is operative to access an audio sample data base stored in a local memory associated with the audio signal generator, the local memory comprising the different audio samples and an identification for each audio sample.

11. The audio signal generator in accordance with claim 1, wherein the information on the duration of each pre-defined sequence is provided in an implicit form, wherein the processor is operative to analyze the implicit information on the duration and to calculate an explicit duration for each pre-defined sequence, and wherein the processor is operative for using the explicit duration for each pre-defined sequence when constructing the audio signal.

12. A method of generating an audio signal comprising a selected length using a database comprising information on a plurality of different pre-defined sequences of audio samples, a sample being an audio signal comprising a time duration larger than one second, each pre-defined sequence of the plurality of pre-defined sequences comprising at least two audio samples, the information for a pre-defined sequence comprising an order of the audio samples in the pre-defined sequence and a duration of the pre-defined sequence, wherein the audio samples are stored in a library so that each audio sample is identifiable using an audio sample ID, wherein the information for the pre-defined sequence comprises a pre-defined sequence of audio sample IDs as the order of the audio samples, comprising:

accessing the database; and constructing the audio signal by serially connecting a plurality of pre-defined sequences using the information on the duration of each pre-defined sequence in accordance with a construction algorithm to acquire a collection of pre-defined sequences representing the audio signal, a combined duration of the collection of pre-defined sequences being as close as possible to the selected length, a number of pre-defined sequences in the resulting collection of pre-defined sequences being minimum, wherein the collection of the pre-defined sequences of audio sample IDs is serially connected for rendering or for generating or storing the audio signal based on a sequential processing of audio sample IDs and the corresponding audio samples.

13. A non-transitory storage medium comprising stored thereon a computer program for performing a method of generating an audio signal comprising a selected length using a database comprising information on a plurality of different pre-defined sequences of audio samples, a sample being an audio signal comprising a time duration larger than one second, each pre-defined sequence of the plurality of pre-defined sequences comprising at least two audio samples, the information for a pre-defined sequence comprising an order of the audio samples in the pre-defined sequence and a duration of the pre-defined sequence, wherein the audio samples are stored in a library so that each audio sample is identifiable using an audio sample ID, wherein the information for the pre-defined sequence comprises a pre-defined sequence of audio sample IDs as the order of the audio samples, the method comprising:

accessing the database; and constructing the audio signal by serially connecting a plurality of pre-defined sequences using the information on the duration of each pre-defined sequence in accordance with a construction algorithm to acquire a collection of pre-defined sequences representing the audio signal, a combined duration of the collection of pre-defined sequences being as close as possible to the selected length, a number of pre-defined sequences in the resulting collection of pre-defined sequences being minimum, wherein the collection of the pre-defined sequences of audio sample IDs is serially connected for rendering or for generating or storing the audio signal based on a sequential processing of audio sample IDs and the corresponding audio samples.

\* \* \* \* \*